Dec. 29, 1959   B. BROWER ET AL   2,919,138
DOLLY ATTACHMENTS FOR SUIT CASES OR LIKE ARTICLES OF MANUFACTURE
Filed March 7, 1958
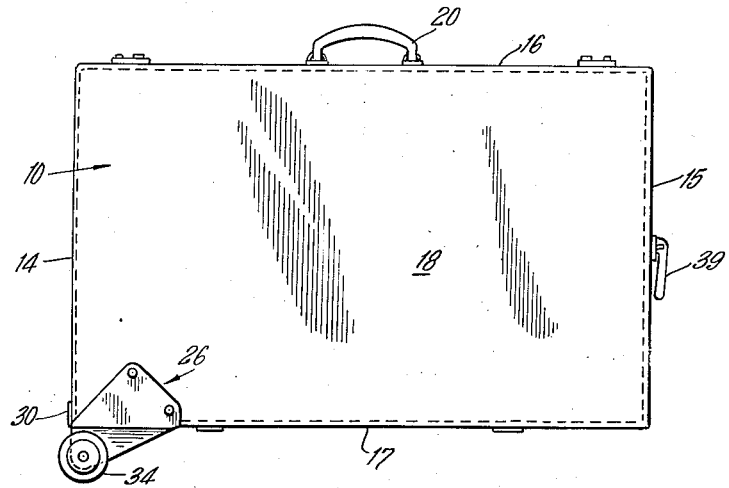
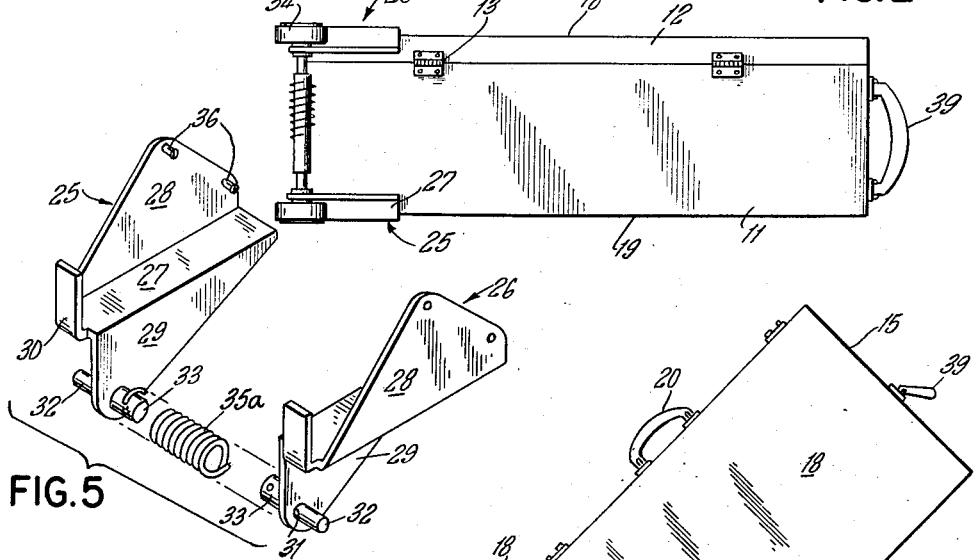
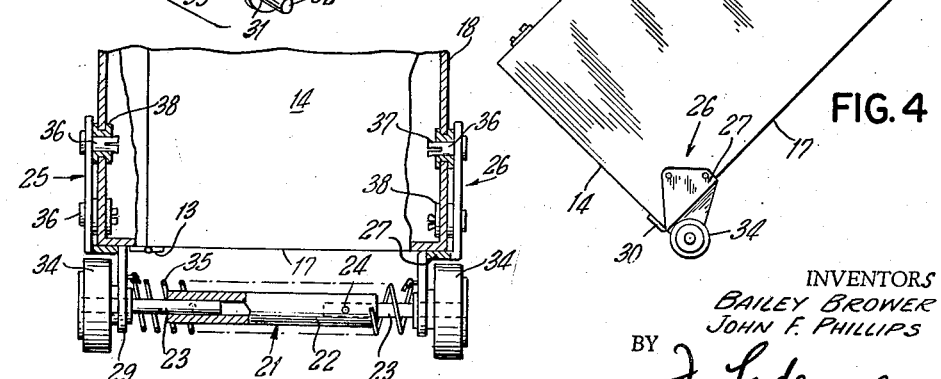
INVENTORS
BAILEY BROWER
JOHN F. PHILLIPS
BY
J. Ledermann
ATTORNEY

United States Patent Office 2,919,138
Patented Dec. 29, 1959

2,919,138

DOLLY ATTACHMENTS FOR SUIT CASES OR LIKE ARTICLES OF MANUFACTURE

Bailey Brower, Patchogue, and John F. Phillips, Bellport, N.Y.

Application March 7, 1958, Serial No. 719,901

2 Claims. (Cl. 280—35)

This invention relates to suit cases, and an object thereof is the provision of wheels, a wheeled truck, or the like mountable or attachable to suitcases of various sizes, whereby the user, instead of having to carry a heavy or filled suit case in the usual manner either under his arm or suspended from the usual handle, may roll or pull the suit case along on its wheels. The advantages of such an improvement are too obvious to detail, for almost every person has had the experience of tiring under the load of a suit case he was carrying.

Another object of the invention is the provision of what may be termed a "kit" including a wheeled truck or dolly, by means of which the owner of a suit case may himself attach the wheels to his suit case without much labor.

Still another object of the invention is the provision of a wheeled truck for suit cases, which may not only be readily attached to the suit case by the owner but which may also easily be detached therefrom whenever he desires.

A further object of the invention is the provision of a wheeled truck for a suit case, which includes means for varying the distance between the wheels so that the same truck is adapted to fit cases of varying widths.

The above as well as additional objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the details shown or described except insofar as they may be deemed essential to the invention as defined in the appended claims.

Referring briefly to the drawing,

Fig. 1 is a side elevational view of a suit case having a wheeled truck, following the precepts of the present invention, attached thereto.

Fig. 2 is a bottom plan view of the suit case of Fig. 1.

Fig. 3 is an enlarged fragmentary rear elevational view of the suit case, with parts broken away and partly in section.

Fig. 4 is a side view of the suit case, showing the same tilted and supported on the wheels, to be towed thereon.

Fig. 5 is a fragmentary perspective view of one form of the attachment with the wheels omitted.

Referring in detail to the drawing, the numeral 10 indicates a case such as a suit case, trunk or the like, including the body 11 and the cover 12 secured thereto by the usual hinges 13. To facilitate the description, the various walls of the case are indicated as follows: end wall 14, end wall 15, top wall 16, bottom wall 17, and side walls 18 and 19. The top wall carries the usual handle 20.

In the form of the invention illustrated in Figs. 1 through 4, a telescopic axle 21 is provided, composed of a sleeve 22 having a rod 23 slidable therein at each end thereof, and set screw, of which one is shown at 24, to interlock the rods with the sleeve.

Common to both of the disclosed forms of the invention, are two brackets 25 and 26 which are mirrored images of each other and are adapted to be positioned in alignment against any pair of opposed corners of the case with their ledges 27 in contact with the bottom wall 17, as shown, or with either side wall, not shown. Each bracket 25 and 26 is preferably made of one piece of metal and has a triangular-shaped wall 28 extending upward from one edge, i.e., the outside edge of the ledge 27, and a second substantially similarly shaped wall 29 extending downward from the ledge along the opposite or inner edge of the ledge. These walls extend at right angles to the ledge, and in addition a tongue or wall 30 extends upward at right angles from the outer end of the ledge. Thus a corner pocket including the walls 28 and 30 and the ledge 27 together constitute a recess for a corner of the suit case to register in.

Aligned openings 31 are provided through the walls 29. In the form shown in Fig. 5, which omits the sleeve 22, stub axles 32 are rigidly mounted in these openings to extend outward therethrough, and on their inner ends 33 they are enlarged. Wheels similar to those shown at 34 in Fig. 3 but not shown in Fig. 5, are rotatably mounted on the axles 32. A coiled spring 35a has one end surrounding and anchored to each enlargement 33 of these axles, whence it draws them as well as the brackets 25 and 26 together. At two or more points on the wall 28 of each bracket, preferably positioned in the two corners of the triangular wall as shown, are prongs 36 projecting inward, which have expansible or bifurcated extremities 37.

To mount the attachment of Fig. 5 on the case, aligned pairs of holes are provided in opposite walls of the case, such as the walls 18 and 19, in which holes grommets 38 are mounted. Then, assuming that the spring 35a in its normal untensed condition holds the brackets apart a distance substantially smaller than that between the walls 18 and 19, the brackets are mounted on the opposite walls by stretching the spring and engaging the prongs 36 in their respective grommets and pushing the prongs inward so that their heads 37 expand to retain them from withdrawal. The mounted brackets, with wheels 34 thereon, will then be firmly attached to the case and will appear on the case as shown in Figs. 1, 2 and 4. As the bracket 26 is attached to the wall 18 which is part of the cover 12, it will swing with the cover when the case is opened and will be returned to proper position upon closing the case, without having to be removed. It is apparent from Fig. 4 that, with the provision of any kind of provisional handle 39 on the end wall 15, the case when tilted as shown in Fig. 4 may readily be towed on the wheels 34. If desired, the device may be attached on opposite ends of one of the walls 14, and this may be desirable for heavy cases. It is apparent that because of the elongatability of the spring 35 the device is applicable to suit cases of different thicknesses.

The form shown in Fig. 3 is identical to that just described except that instead of the stub axles 32 the axle is telescopic as mentioned above, and the wheels 34 are mounted on the rods 23. In this form, after the axle has been lengthened to the required degree to permit the bracket prongs to enter their grommets, the spring is permitted to pull the brackets together. Actually, the set screws 24 might be omitted, but if desired they may be provided to lock the axle against telescoping. Or, as a further modification, the spring 35 may be omitted with the telescoping axle and the set screws used to lock the axle after the bracket grommets have been forced home. If desired, the wheels 34 might be extended outward from their positions shown in Fig. 3.

With the suit case tilted as shown in Fig. 4, it is apparent that the case is supported on the ledges 27 and the walls or tongues 30, rather than entirely by the grommets and the prongs passing therethrough, thus making for sturdiness.

It is to be noted that what may be termed "three dimensional corner brackets" are formed in the case of each bracket 25 and 26 by the ledge 27 and the walls 28 and 30.

It is further to be noted that wherever the term "suit case" has been used herein and in the claims, this term is intended to include trunks as well as luggage containers of any form which include a body and a hinged cover.

The invention having thus been described, what is claimed and desired to be secured by Letters Patent is as follows:

1. A wheeled attachment for a suit case or like article of manufacture which includes a body and a cover hinged to the body wherein the cover constitutes one side wall of the case and the wall of the body opposite the cover constitutes the other side wall thereof and wherein the hinge axis of the cover lies in the bottom wall of the case, the attachment comprising a pair of spaced corner brackets which are mirrored images of each other having each a ledge, an upright first bracket wall extending from one longitudinal edge, a second bracket wall parallel to said first bracket wall extending downward from the opposite longitudinal edge of the ledge, and an end bracket wall extending upward from one end of the ledge at right angles to the ledge, the brackets providing corner recesses between the ledge, the upright bracket wall and the end bracket wall thereof, the brackets being adapted to be positioned with said upright bracket walls against said side walls of the case with two adjacent corners of the case registering in said recesses with said end bracket walls positioned against the adjacent end wall of the case and said ledges positioned against said bottom wall, said second bracket walls having aligned journals therein, stub shafts slidably mounted in said journals having wheels mounted on the outer ends thereof, the stub shafts having enlarged inner ends positioned between said second bracket walls having a diameter larger than the diameter of said journals, and flexible means normally urging said enlarged ends of the stub shafts in opposite directions to engage said second bracket walls.

2. A wheeled attachment according to claim 1, said means comprising a normally tensed coiled spring having the ends thereof secured to said enlarged inner ends of said stub shafts.

References Cited in the file of this patent

UNITED STATES PATENTS

| 220,673 | Sloan | Oct. 14, 1879 |
| 2,789,828 | Gary | Apr. 23, 1957 |

FOREIGN PATENTS

| 869,576 | France | Nov. 17, 1941 |
| 676,355 | Great Britain | July 23, 1952 |
| 83,933 | Norway | May 8, 1954 |